United States Patent [19]
Fonda

[11] 3,716,110
[45] Feb. 13, 1973

[54] STEERING AND DIRECTING MECHANISM

[76] Inventor: Albert G. Fonda, 481 Stacey Drive, King of Prussia, Pa. 19406

[22] Filed: July 22, 1970

[21] Appl. No.: 57,120

[52] U.S. Cl.............180/79.2 R, 74/388 PS, 180/79
[51] Int. Cl. ..............................................B62d 5/06
[58] Field of Search..........180/79, 79.2 R; 74/388 PS

[56] References Cited

UNITED STATES PATENTS

| | | | |
|---|---|---|---|
| 2,410,049 | 10/1946 | Davis | 180/79.2 R |
| 2,904,120 | 9/1959 | Bidwell | 180/79.2 R |
| 3,033,051 | 5/1962 | Reinke et al. | 180/79.2 R X |
| 3,205,984 | 9/1965 | Gomez | 180/79.2 R X |
| 3,241,630 | 3/1966 | Snabes et al. | 180/79.2 R |
| 3,408,900 | 11/1968 | Tomita | 180/79.2 R X |
| 3,456,752 | 7/1969 | Fonda | 180/79.2 R |
| 3,565,205 | 2/1971 | Planas | 180/79.2 R |
| 3,580,352 | 5/1971 | Hestad et al. | 180/79.2 R |

FOREIGN PATENTS OR APPLICATIONS

| | | | |
|---|---|---|---|
| 1,186,343 | 1/1965 | Germany | 180/79.2 R |

*Primary Examiner*—Leo Friaglia
*Assistant Examiner*—Leslie J. Paperner

[57] ABSTRACT

A power drive means of the motion augmentation type is provided by means of actuation of a reaction element of a kinematic machine coupling directing and dirigible members, to effect differential motions thereof in response to selected effects of directing motion. Means adaptable to rack-and-pinion steering and means adaptable to worm-and-pitman-arm steering are disclosed. The approach is adaptable to either hydraulic or electrical actuation. Stability augmentation may also be provided from sensors of vehicle maneuvering, resulting in adaptive steering.

30 Claims, 9 Drawing Figures

STEERING AND DIRECTING MECHANISM

BACKGROUND OF THE INVENTION

1. Field of the Invention

This invention relates to power drive systems responsive to manual input and, in particular, to a motion augmentation type of power drive first described in my U.S. Pat. No. 3,456,752 issued July 22, 1969. The present application discloses embodiments of a particularly compact, efficient, and readily manufactured form.

My inventions will find particular applicability wherever an operator can be provided with directing means allowing him to exert a force through a distance, and where the demands of the operated mechanism on the operator are excessive in terms of continued muscular effort, or skill and coordination, or both. A typical task of this type is the operation of the steerable, course-directing elements of a vehicle. Another is the operation of an artificial, somewhat remote, powerful extension of a human limb, as for cargo handling, manipulation in adverse environments, or negotiation of adverse terrain.

2. Description of the Prior Art

Art prior to my previous patent was described therein. Briefly, the inventors of earlier power boost systems have single-mindedly limited themselves to the boosting of effort, not of motion. That is, a linkage would be devised which would provide a proper motion ratio, relating output motion needs to input motion capability of the operator; then if effort proved to be excessive, especially as the size of the machinery increased, means to augment the operator effort would be provided. This ignored the converse possibility of initial design of the linkage for a proper effort ratio, whereafter if motion proved to be excessive, means to augment the operator motion could be provided. As power is effort times velocity, if either effort or velocity is boosted, then power is boosted. Yet, of the two possible basic types of power boost, only effort boost has been used prior to my previous patent.

At times, motion-producing actuation systems falling short of true power boost have been used. One such system has been full remote control, or in the airplane a "fly-by-wire" system, in which all motion is derived from the actuator, with none of the operator's power actually applied to the load. Another system, also used in aircraft, has been the strictly stability augmentation type of motion augmentation, used to modify slightly but strategically the motion induced by the operator. Alternate additions and subtractions of small amounts of power occur, normally totalling zero over any complete cycle of operation. When the same task also requires power boost, a conventional effort-boost system is additionally provided, as in the collective pitch control system of the large helicopter. The result is two completely separate servo systems, one for power and another for stability, jointly assisting the operator in a given task. A third and rare type of motion augmentation system has been the auxiliary drive using true motion supplementation to assist the operator, but with only crude on-off controls requiring specific and repetitive operator attention, aided at most by a limit-stop-operated off switch to obviate over-run. All of these approaches failed to grasp the simple essential of providing substantial power-driven motion augmentation according to the operator's motion, thereby to provide power boost. After this is done, stability augmentation using appropriate modulation of the same power drive means can follow. My previous invention, as prior art for the present invention, provided exactly these features.

SUMMARY OF THE INVENTION

The present invention draws upon this prior art but is distinguished from my previous invention by restriction to the use, in the power drive means, of a kinematic machine with an actuable reaction element.

It is one of the objects of the present invention, thereby achieved, to minimize the portion of the mass of the power drive means which must be accelerated or decelerated through the efforts of the operator. Another object also thereby achieved is the compact packaging of the entire mechanism in a housing at the base of the steering column of an automobile, using for the most part components of conventional automotive design.

Further objectives held in common with my previous invention are the provision of the utmost fidelity of "feel" through the mechanism, avoidance of the sudden rise in effort needed in conventional systems upon loss of boost and provision instead of "fail-safe" bumpless transfer to the unboosted condition, provision of simpler and more flexible means of achieving nonlinearity between input and output motions, and the provision of stability augmentation in the "fixed-control" condition and without the complexities of auxiliary power drive and mechanical disconnects and fail-safe reconnects.

Another objective, common to both inventions but clarified and developed in the present disclosure, is to permit the use of electrical actuation in applications in which it has been considered unsuited, such as for automotive steering. Other objects and advantages will be apparent upon consideration of the present disclosure in its entirety.

It is my proposal to provide a power drive system wherein a directing and a dirigible element are coupled by a kinematic machine including at least one moveable element such as a lever, crank, gear, wedge, or screw, reacting in a direction on, and constrained in that direction by, a reaction element such as a pivot, stator, or bearing surface. Further, actuation of this otherwise fixed reaction element along the line of reaction thereon by the moveable element will be provided. Thereby, relative motion of the directing and dirigible elements will be actuable while at all times kinematic linkage of directing and dirigible members will be provided. Simultaneous motions of the directing member and the reaction element will produce the sum of their individual effects at the dirigible member. The result may constitute power boost, or stability augmentation, or both, according to the nature of the power modulation means controlling the actuator.

Fail safety in the event of loss of power is provided by means of irreversibility at the actuator, so that the reaction element becomes fixed in the direction of actuation when power is absent. The term irreversibility in the present disclosure is meant to include means, more fully described in my previous patent, whereby loss of power induces engagement of an actuator locking means.

I propose power modulation as in my earlier patent; modulation from any element responsive to some effect of the manually operable motion. This will typically consist of the motion of the directing member as a "command" variable in combination with one or more "response" variables such as the motion of the dirigible member, the motion of the power drive means, or some more remote variable providing for improved operator control, such as a parameter of vehicle maneuvering. The sum of these signals at a "summing point" will constitute an "error" signal, command less total response, for application to the actuator, with polarity such that the actuator will tend to reduce the error.

Such feedback and loop closure produces a power-boosted positioning device, even though the actuator or servomotor in the loop, if it were operated open-loop, would typically produce either effort (hence, acceleration) or velocity in proportion to applied signal. Open-loop, the position response would be the single or double time integral of command; closed-loop, the developing response nulls command, and produces vanishing error with response position proportional to command. It may be noted that conventional automotive effort-boost power steering is arranged open-loop, the signal to the actuator being purely command effort, to which the actuator responds by producing effort additive to command effort.

I specifically propose a compact and workable mechanism for positioning a power modulating element, whether hydraulic or electrical, according to command motion less dirigible member motion, with provisions for intentional nonlinearity, stability augmentation, and accomodation of actuator position lag due to stall or loss of power without loss of command index and without any gross restart transient.

DESCRIPTION OF THE PREFERRED EMBODIMENTS

A kinematic machine may be defined as two or more parts constrained relative to each other, of which at least one is a fixed reaction element; which by a predetermined intermotion, may serve to transmit and modify force and motion. By the principle of force and moment equilibrium, the reaction at a reaction element will equal the change in force or moment through the movable member constrained thereto.

Figure 1A:
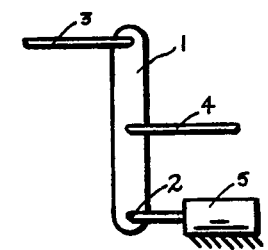
FIG. 1 is a series of simple representations of typical kinematic machines including in FIG. 1a the lever, in FIG. 1b the crank, in FIG. 1c the wedge, in FIG. 1d an epicyclic version of the gear, in FIG. 1e the screw, and their various respective reaction members with actuators therefor.

For instance, FIG. 1a shows a kinematic machine consisting of a straight lever 1, the moveable member, and a pivot 2, the reaction element. Forces normal to the lever, tending to cause rotation thereof about the pivot, can be applied by the rods 3 and 4, of which one may be the directing member and the other the dirigible member. The directing and dirigible members are thus coupled by this kinematic machine, the lever and the pivot. The force differential between the directing and dirigible members is the reaction at the pivot 2. An actuator 5 has been provided at this pivot, aligned to actuate the pivot normal to the lever, that is, in the direction of the reaction of the lever upon the pivot. If either rod 3 or rod 4 is held while the pivot 2 is actuated, the resulting angular motion of the lever 1 will cause the other rod to move. The formerly fixed rod might then be moved, giving the sum of the consecutive motions at the other rod. The same sum will occur if all motions are simultaneous, this being the principle of superposition. Of the total work done at the dirigible member, part will have been done by the directing member and part by the actuator. Thus, although there is no effort boost, there is power boost; power boost of the motion boost variety.

Of course, there is an effort (force) ratio through the lever. Relative to a single continuous rod, if 3 is the directing member then the directing effort required is reduced by the kinematic machine. Without actuation, the stroke at 3 is increased by the machine, resulting in the same work done. With actuation, the stroke at 3 can be reduced, say to its former level. Thus, motion boost combined with an increased mechanical advantage can give much the effect of effort boost, that is, the same motion but reduced effort. Such a possibility is inherent in the fact that both methods do provide power boost.

As is clarified by reference to FIG. 1a, the action of my invention will be distinguished from that of ordinary effort boost at least in that (1) there is no possible masking of the "feel" available through the device; the "feel" is as faithful as if no boost had been used; (2) bumpless transfer to a fail-safe condition is afforded by mere actuator irreversibility; there is no sudden rise in effort required at the moment of failure, nor maintainance of high level while failed; (3) nonlinearity at the power modulation means will give extra output motion at, say, the extremes of input motion, as is often desired, with only minor expense for nonlinear components; and (4) the addition of stability augmentation, to produce what others have called "adaptive" steering, requires only the provision of further power modulation, not the addition of a complete secondary drive system.

Other kinematic machines with actuable reaction elements are shown by my remaining drawings. Moveable elements thereof are a bent lever or crank 11 in FIG. 1b, a wedge 21 in FIG. 1c, a gear 31 in FIG. 1d, and a nut 41 in FIG. 1e. The corresponding dirigible members are a rod 14, a rod 24, a shaft 34, and a sector, pitman shaft, and pitman arm 44 with attached rod. The corresponding actuable elements are a pivot 12, a plane bearing surface 22, a stator gear 32, and a rotary thrust bearing 42. The direction of actuation is in the direction of reaction in each case: diagonal in FIG. 1b, vertical in FIG. 1c, tangential in FIG. 1d, and axial to the screw in FIG. 1e. Note that a useless component of actuation is not prohibited; for instance, the actuator in FIG. 1b might be either vertical or horizontal rather than diagonal, although its most efficient orientation is along the line of the reaction. The crank legs (the radii to the forces) need not be equal and normal as shown; the actuator's optimum axis remains the diagonal to the intersection of the force lines of action. A very large mechanical advantage through the kinematic machine, for instance a very short arm to the dirigible member, may be used when the load force is large.

In each of these embodiments, movement of either the reaction element or the directing member while the other is fixed will induce motion of the dirigible member; or these effects may be simultaneous, by superposition. During movement of the reaction member, the directing member may be constrained either by the operator or by irreversibility of the drive from the operator to the directing member. If the directing member is not constrained, and if the dirigible member meets resistance, movement of the reaction member will fail to produce the same motion of the dirigible member. That is, the dirigible member can be forced to move exclusively by reaction against the directing member; without such reaction, the dirigible member cannot be forced to move. I define this to include any combination having an irreversibility, considered with the irreversibility removed; however, it will usually be preferable to provide the operator with full feel, rather than to provide irreversibility.

It is evident further, as in each above embodiment, that the manually operable inertia of the kinematic machine does not include the inertia of the actuator, and is less than the manually operable inertia when the actuator itself is located directly connecting a point of the directing member with a point of the dirigible member as in some of the embodiments of my earlier patent. My present disclosure thus specifies means which facilitate reduction of the manually operable inertia of the steering and directing mechanism.

The adaptation of power drive embodiments such as those of FIG. 1 into existing mechanisms, while readily accomplished by one skilled in the art, will best include performance of the function of an already existing and necessary kinematic machine and reaction member. It is also generally preferable to locate the motion boost device fairly near the operator, so that the remaining linkage (and particularly any geared or threaded element) is exercised its full stroke at all times, not merely on loss of boost. This avoids the need for extra stroke capability which is rarely if ever used, and might not be in good working condition when needed.

Figure 1B:
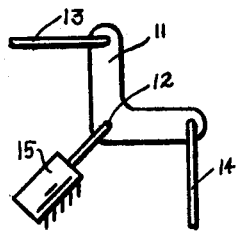
Figure 1C:
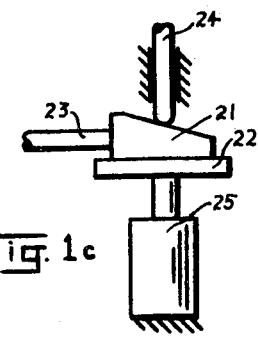
Figure 1D:
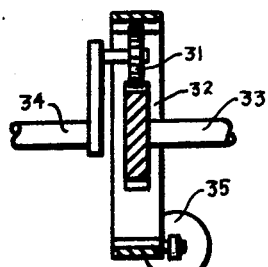

The conventional automotive steering linkage is sufficiently compact and direct as to have no existing crank or lever corresponding to those of FIG. 1a or 1b, and has no wedge corresponding to FIG. 1c. Adding the desirability of locations fairly close to the driver, arrangements in the steering box or steering column may be most appropriate. Epicyclic gearing such as that of FIG. 1d, of which many versions are well known, may be interposed in either the steering or the pitman shaft. Of these alternatives, gearing in the steering shaft would be of much lighter construction and would preserve use of the full stroke of the steering box during motion boost. Of course, the epicyclic gear train is not an existing kinematic machine in the automobile, as would be desirable. For some applications, a conventional handwheel might be replaced with a combined handwheel and epicyclic drive, to readily convert an existing manual rotary drive to boosted operation.

Figure 1E:
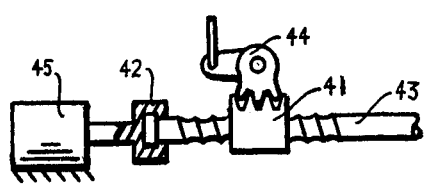

Actuation of the thrust bearing of a conventional automotive steering box, as illustrated in FIG. 1e, does have the advantage of utilizing an existing reaction member. It has the disadvantage of being located beyond the worm reduction; the end threads of the worm would not be utilized during motion boost. This might have no adverse effect on fail-safe reliability, as with recirculating balls the thread wear is normally trivial. A more serious disadvantage of this otherwise promising arrangement is imposition of some complexity of the power modulation means to avoid a position transient upon restoration of lost boost power. This problem may be best illustrated by discussion of FIG. 2.

Figure 2A:
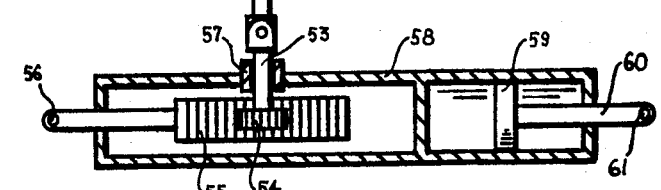
FIG. 2 portrays a rack-and pinion version of the gear, with actuation for the bearing on which the pinion reacts, shown in top view in FIG. 2a and in front view in FIG. 2b.

A motion-boosted rack-and-pinion steering is illustrated in top view in FIG. 2a. A rack and pinion may be considered a portion of an epicyclic of infinite sun gear and planet radius, with a torqued planet gear shaft.)

A steering shaft 51 is flexibly jointed to drive an extension shaft 52 driving a pinion shaft 53 and pinion 54. Rotation of the pinion causes translation of the rack 55 and thereby positions the rod end 56 operating the steering. A journal bearing 57 carries the pinion shaft 53 and comprises the reaction element for the rack thrust on the pinion. Actuation of this reaction element is provided by the housing 58 in which it is mounted, extended to house and seal against a piston 59 with piston rod 60 attached to structure at rod end 61. Hydraulic actuation will move the entire housing and pinion bearing transversely, flexing the shaft joints and relocating the rack and rod end 56.

Figure 2B:
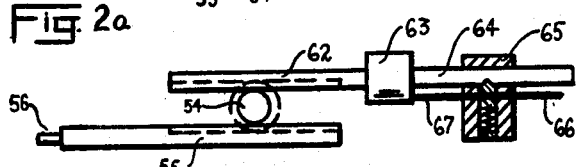

A power modulation means is shown in FIG. 2b, an elevation view of the same device. A secondary rack 62 operates a hydraulic control valve 63 attached to structure through rod 64 and retainer 65. In the boosted condition, the pinion 54 in effect rolls along the virtually stationary rack 62, driving the rack 55 at twice its normal rate, while small movements of the rack 62 open the valve sufficiently to actuate the bearing and housing the indicated amount.

Upon loss of power, irreversibility provided at the actuator immediately prevents further motion of the housing 58. Increased rotation of the steering shaft 51, and use of previously unused teeth of the rack 55, will permit control of the rod end 56 through the previous range. Meanwhile, the secondary rack 62 will move an equal amount in the opposite direction, driving the valve to its internal limit stops whereupon the rod 64 slides through the retainer 65.

The necessary length of both racks will be not two but three times the length used in the boosted mode. Then, if power failure occurs at a hard-over condition, at one-third of the rack length, the remaining two-thirds of rack length is sufficient for manual control back to centered output and an equal distance beyond.

Various forms for the retainer 65 may be discussed: a spring form, a friction form, and a detent interlock form as illustrated. In the spring form, a spring force will always act to return the rod 64 to its centered position. During the unpowered condition, this merely exercises the spring, but on restoration of power, the spring will hold the valve 63 open while the actuator drives the housing 58 as far as necessary, at that instant, to recenter the rod 64 in the retainer 65. This restart transient, which may be quite large, is unacceptable in most applications.

In the friction form, the movement of the rod 64 through the retainer is continually resisted by friction. Upon restoration of power, the only transient is the small amount necessary to immediately recenter the valve between its internal limit stops. This is in itself acceptable. However, powered operation will then continue about a new center position, offset from the old center as much as one-third the length of the rack. After a second loss and restoration of power, this offset may increase further, resulting in operation of one or more of the components against its limit stops. This result is unacceptable.

If the retainer 65 is a detent as illustrated but without the interlock described later, it will be workable provided the detent center breakout force exceeds the breakout force of a spring centering means within the valve, in turn in excess of the friction of the detent sliding on the rod 64. By such means, the valve will not reopen until the detent is re-engaged, restoring original index.

An alternative means is as illustrated, wherein the detent in 65 when lifted interrupts the hydraulic flow from line 66 through line 67 to the valve 63. Then, even after restoration of pressure to line 66, unboosted manual operation will continue until the pre-failure index is regained and the detent drops into the notch: then, boosted operation resumes without a transient.

Power modulation arrangements analogous to those above could be adapted to various of the power drive means of FIG. 1, and others which might be devised by my teaching.

Figure 3:
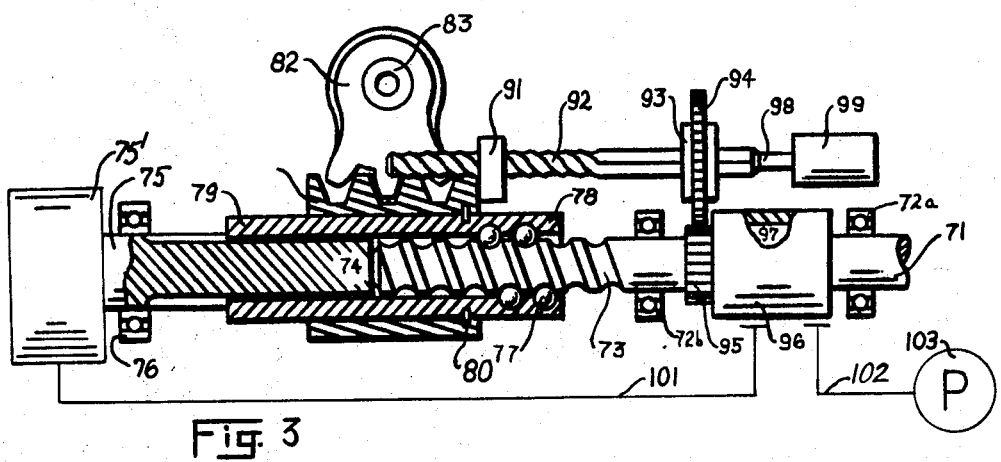
FIG. 3 is an axial section of a worm-and-pitman-arm steering device with rotary actuation of a nut constrained axially to the rack which drives the sector, with a complete feedback linkage suitable for either electrical or hydraulic power modulation, and with provisions for nonlinearity, stability augmentation, and accomodation of actuator position lag.

The embodiment shown in FIG. 3 avoids the loss-of-index problem, and has other advantages. A manually operable steering shaft 71 is located axially and radially by bearings 72 in a housing (not shown) enclosing and supporting the remaining mechanism shown, constituting the entire power drive means by my teaching. Shaft 71 extends to form a worm 73, in turn extending to a bearing at 74 in a rotatationally actuable shaft 75 located axially and radially by a bearing 76. Any suitable (probably multi-turn) irreversible rotary actuator (75') may be used to actuate shaft 75.

The worm 73 engages balls 77 in turn engaging and recirculated by a nut 78 extending to form an internally noncircular tube 79 matingly engaged with the exterior of the actuable shaft 75, and axially slideable thereon. The assembly so far described is possessed of considerable beam bending stiffness between the bearings 72 and 76, even with only one circuit of recirculating balls 77.

A snap ring 80 in the nut 78 axially engages an extension of a rack 81, radially guided by the tube 79 rotating therein. The rack 81 is engaged with a sector 82 and prevented from rotation thereby. The sector 82 rotates with a pitman shaft 83 extending out of the power drive housing to rotate a pitman arm, not shown, through an arc, thereby driving a steering linkage.

The parts so far described are capable of driving this linkage through its normal stroke in an entirely conventional manner, provided the actuable shaft 75 is constrained from rotation due to torque on the nut 78 equal to the torque on the steering shaft 71. Such unboosted operation will include manual rotation of the steering shaft 71 a sufficient number of turns (say, 4 turns) to advance the balls 77 on the worm 73 the full length of the worm, advance the nut 78, tube 79, and the rack 81 through their entire axial stroke between bearings, and advance the sector 82 through its entire angular stroke.

Upon rotary actuation of the shaft 75, if the steering shaft 71 were held fixed, the same result could still occur, except that the nut 78 would rotate upon the worm 73 instead of the worm within the nut. The balls 77 would still advance the full length of the worm, the nut and rack would traverse the full stroke between bearings, and the sector would be rotated through its entire angular stroke. Thus, in this device only the rotation of the steering shaft itself is diminished by motion boost; the remaining mechanism is utilized and exercised at all times. It remains only to provide appropriate power modulation means, as will now be described.

A local extension 91 of the rack 81 is internally threaded and engaged with a helix 92, a helically formed member which becomes straight and is matingly engaged with and axially slideable in a hub 93. In turn, hub 93 is rotatable in and frictionally engaged with gear 94, radially and axially located by bearings not shown and in turn engaged with a smaller gear 95, rotating on shaft 71 together with the outer member 96 of a power controller. The inner member 97 of the power controller rotates with the steering shaft 71. The cylindrical external surface of the power controller acts as a slip ring connecting with nonrotating conduits (101, 102), whether hydraulic or electrical, connecting the controller with the power source 103 and the actuator 75'.

The straight portion of the helix 92 extends to and is axially but not rotationally constrained by a miniature actuator 99, in turn operated by, or sensitive to, some relevant quantity such as the lateral acceleration, yaw velocity, or speed of the vehicle, or combinations thereof suitable to provide steering and directing stability. Usually, the steering will be actuated to counter (rather than augment) the sensed effect. My previous mentioned patent described such possibilities, of which repetition is unnecessary.

Assuming the miniature actuator 99 fixed, axial motion of the rack 81 will cause rotation of the helix 92, the gears 94 and 95, and the outer member 96, thereby to control power to the actuator and shaft 75. This will cause powered motion of the rack 81, to augment the simultaneous manually induced motion thereof. Noting that the relative angular motion in the power controller will always be quite small, the rack 81 can be imagined as driven axially by the helix 92 rotated by the gearing from the steering shaft. Since this rate of advance is greater than (say, twice) the rate of advance of the worm 73, fewer turns of the steering shaft are required; say, two instead of four. This reduction is due to motion augmentation by my teaching.

The power modulation means just described provides feedback to close the loop around the actuator, and form a closed-loop positioning system. The error signal appears directly at the power controller, as the difference between the command rotation of the inner member 97 and the response rotation of the outer member 96 according to the motion of the dirigible members including the rack 81, the pitman shaft 83, and the further steering linkage. This error signal at the controller is of course applied to the actuator with polarity such that the actuator will tend to reduce the error. A particular advantage of feedback from rack position is that this leaves any rack-to-sector backlash outside the loop. Backlash within a servo loop can lead to dynamic instability of the servomechanism; chattering or hunting. Backlash outside the loop merely causes positioning error as with manual steering.

The pitch of the helix 92 may be increased at the ends, to provide even more rapid advance of the rack 81 for large motions. Conversely, the pitch of 92 may be reduced in the center for finer control. If the pitch in center equals (per turn of the steering shaft) the pitch of the worm 73, there will be no motion boost; if even less, there will be negative boost, if this should be found desirable. Because of the very low forces necessary to operate the power controller, these feedback components can be very light and economically constructed, despite such elaborations as a variable-pitch helix. For instance, the helix may actually be twisted rather than machined, and may engage in 91 with resilient means which accomodate the pitch variation while still dependably driving the controller. Such economies are impossible with main power-transmitting mechanisms.

Small axial motions of the helix 92 imposed by the miniature actuator 99 will rotate the helix in the extension 91, thereby rotating the gears to drive the controller until the rack 81 is actuated far enough to recenter the helix and the controller. In effect, the miniature actuator 99 will be able to drive the rack 81 a distance equal to the stroke of the actuator 99, while small movements of the gears operate the controller sufficiently to actuate the rack the indicated amount. Normally this will be a relatively small motion, sufficient for purposes of stability augmentation. A longer augmentation stroke might be desired for a purpose such as complete automatic control of a gross skid condition by reference to an electronic direction-of-motion sensor. An electronic sensor or the like would require amplification or boost; this would not be classed as "assistance" of (that is, augmentation of the power applied to the load driven by) my steering and directing mechanism; the miniature actuator shares no appreciable portion of the work of the steering actuator, nor even of that portion of the work of the steering actuator devoted to stability augmentation.

The action of this control mechanism in the event of loss of power boost is particularly simple and satisfactory, and requires the use of no additional components. Internal stops are used to limit the motion within the power controller to little more than the full-power condition. Then, rotation of the steering shaft 71, with no powered response will cause the inner member 97 to drive the outer member 96, the gear 95, and the gear 94, which will slip on the hub 93. This will be true even though the hub 93 will be driven at a slower rate by the reduced axial rate of the rack 81, manually powered by the same rotation of the steering shaft 71. Except that the angular stroke of the steering shaft and the gears will be, say, doubled, all motions will be as they were when powered. Bumpless transfer from the powered to the unpowered condition will have occurred.

Upon regaining power, the rotary steering actuator at shaft 75 will simply take up the load and move the rack slightly to null the most recent relative motion in the power controller. The slippage between the hub 93 and the gear 94 will then cease. Virtually bumpless transfer from the unpowered to the powered condition will have occurred. If desired, a pressure-coupled operated flow restrictor or its electrical equivalent could be used to delay the actuator response upon restoration of power, for further assurance of bumpless restart.

Thus, in this embodiment there is no loss of index with loss of power, hence no problem in regaining index on restoration of power. The rack 81 is simply driven as far as desired by whatever means available, whether aided by rotation of the nut 78 or obtained by rotation of the worm 73 alone.

Bumpless transfer both to and from the boosted condition avoids the dangerous disturbances which result under such circumstances in an effort-boost system. Suppose the power were turned on and off once per second, while entering or leaving a turn. The operator of the effort-boost system would be continually struggling to steer properly while drastically disturbed by the rising and falling effort required. In contrast, the operator of the motion boost system would feel little if any variation in effort, and would be hardly aware of the variation of front wheel steering rate without variation of his control steering rate. He would merely find that the position finally achieved by the wheels was less than he would normally have anticipated. If he is controlling not from memory but from his immediate observation of vehicle response, he will simply add the necessary extra input to get the vehicle to go where he wants it, quite possibly without even really realizing he has done anything different.

Suppose instead the power were simply turned off while the vehicle was following a turn. The operator of the effort-boost system would promptly experience a rise in effort for which he was unprepared. Before he can possibly respond, the wheel will be turned toward the straight-ahead position. This immediately swerves the vehicle. The driver then will increase his effort enough to return the wheel not only to its previous position, but beyond it to correct for the first swerve. He may also overcorrect out of alarm. The result may well be total loss of control of the vehicle, and an accident. Indeed, an accident might occur on just the first or second swerve. In contrast, the operator of a motion-boost system would experience no problem at the moment of failure: there will be no change in effort and, at that moment, no change in the steering motion required. Thereafter, as already described, he need simply add the necessary extra input to get the vehicle to go where he wants it. The need for extra input is only in comparison with his memory, and this need is not sudden, but merely accumulates gradually due to reduced control effectiveness.

There is even time to give the driver an audible or visual warning of the boost failure. Such a warning would be provided, not with the intent that the operator remember the specific meaning of the cue, but simply to increase his general alertness to all cues including those of steering wheel feel and rate of vehicle response. Such a provision may prove quite superfluous; even if provided, it would represent a concern for fail safety far beyond that presently offered or possible. The warning necessary to prepare an operator for sudden loss of power in an effort boost system would have to be given appreciably in advance of the failure itself; and impossible requirement.

The motion-boost system is so tolerant of power failure that not only is there no disruptive transient upon sudden failure, but following failure there is no drag and no wasting of operator power. In effect, the system reverts to manual steering without any attention, and can be used in that form indefinitely, pending repairs. The incentive to have the system repaired will arise not from any safety consideration, but from a simple desire to avoid turning the wheel so far all the time. Thus, older vehicles, approaching their last days, will still be safely operable despite the understandable inability of an impoverished owner to effect power boost system repairs.

If motion boost by my teaching is used with very large boost ratios, then the advantage of fully manual operation without boost may be trivial; the load would not be operable by manual means alone. Still, the advantage of accurate force feedback to the operator will remain. The use of one power system to drive the load and another, smaller power system to return feel force to the operator will be unnecessary; only the main drive system, plus feel linkages picking up the main drive effort, will be necessary.

As previously noted, any suitable rotary actuator for shaft 75 may be used, with a corresponding power controller. If hydraulic, the controller may follow conventional automotive practice, except that underlap might be reduced to give more nearly flow control rather than pressure control. Pump design might be altered accordingly from constant-flow to constant-pressure, as is more conventional in aircraft. The rotary hydraulic actuator would not be conventional by automotive standards, but might utilize conventional aircraft design principles. Indeed, the motor might share some of the components of the pump, a distinct economy. A speed reduction gear from motor to shaft 75 would minimize the size of the motor by increasing its speed and mechanical advantage. An adaptation to the conventional short-stroke, high-force automotive piston-and-cylinder actuator might be made, but would involve operation of the actuator through a mechanical disadvantage to obtain the greater stroke and lesser force needed for use in my preferred location, as close to the operator as possible. FIGS. 1e and 2 show applications more suited to such actuators.

Figure 4:
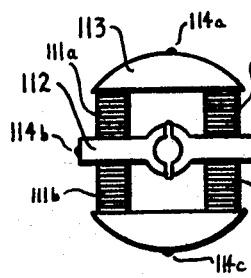
FIG. 4 represents a possible electrical controller.

If the actuation is electrical, less design precedent exists. I contemplate a power controller utilizing surface-to-surface resistive elements stacked, as in FIG. 4, to form a pressure-sensitive variable resistor, with four stacks 111 $a,b,c,d$ arranged and interconnected to form a bridge circuit of which two opposite resistances are decreased as the remaining two are increased, with small applied motions of the inner member 112 relative to the outer member 113. Two terminals 114 $a,c$ would connect to supply; the other two terminals 114 $b,d$ to load. This device might obviate the need for electrical amplification from controller to actuator. On the other hand, recent advances in solid-state controllers may permit the use of economical amplifiers. The superposition of electrical stability augmentation signals, in place of the miniature actuator 99, should be possible.

An electrical actuator may be quite feasible because of the great tolerance of this system to actuator stall. The conventional effort-boost system is quite intolerant in this regard. The conventional automotive hydraulic system when driven beyond its capacity not only exerts a power-absorbing drag against the operator, as the motor becomes a pump, but also emits disturbing noises. As a consequence, the system is built considerably oversize so far as normal conditions are concerned, in order to avoid even occasional overload. The condition for which the conventional system is sized is not only the parking condition rather than the driving condition, but the worst parking condition rather than a moderate or average parking condition.

Whether the actuator be hydraulic or electrical, with my invention the actuator may be sized for a much less severe operating condition, whereafter occasional actuator stall may be tolerated. By virtue of bumpless transfer, there will be no effect on feel due to actuator stall; the effect will merely be that a greater distance of steering will be required. This would never occur in driving, only in parking, and then only at high steering efforts and rates. At such negligible vehicle speeds, there will be no loss of safety in vehicle control. The system will merely curtail the ability of the frenetic and muscular driver to command large power outputs from the power boost system.

A concave torque-speed curve will be appropriate for such an actuator. That is, not only may the power at low steering rates be less than is presently conventional, but further, a diminution of torque at a decreasing rate, as actuator speed is increased, may be most appropriate. A series-wound direct-current motor provides such a characteristic. The concave torque-speed curve gives a relatively flat power-speed curve, denoting a further reduction in peak power requirement. I estimate that the approach outlined above will reduce the peak power requirement to one half or one quarter of the usual level, and make electrical power steering entirely feasible. This would completely eliminate the mechanical drive, hydraulic pump, and hydraulic hoses of the conventional automotive power steering system; the present electrical generator and storage battery would power the steering boost. The considerable storage capacity of the ordinary battery would be available for peak demand periods such as parking, and would be replenished by existing excess generation capacity while driving. If the vehicle were electrically propelled, the anachronism of an electrical motor driving a hydraulic pump driving a hydraulic motor would be avoided; all drives would be electrical.

From the foregoing it will be seen that my invention provides a steering and directing mechanism, with power drive means including an actuable reaction

I claim:

1. A steering and directing mechanism including a directing member and a dirigible member operable each in a selected mode, power drive means comprising a kinematic machine interposed to operably connect said members in said modes and further comprising actuating means for the actuation of a selected reaction element of said kinematic machine to effect the substantial movement of either of said members with respect to the other, and power modulating means for controlling said actuating means, comprising at least one element responsive to a selected effect of the motion of said directing member in said selected mode.

2. Mechanism as in claim 1, wherein said kinematic machine is a lever.

3. Mechanism as in claim 1, wherein said kinematic machine is an epicyclic train.

4. Mechanism as in claim 1, wherein said kinematic machine is a wedge.

5. Mechanism as in claim 1, wherein said kinematic machine is a rack and pinion.

6. Mechanism as in claim 1, wherein said kinematic machine comprises a pair of matingly threaded members with constraints whereby one of said pair is axially constrained by said actuable reaction element and one of said pair is torsionally constrained.

7. Mechanism as in claim 1, wherein said kinematic machine comprises a pair of matingly threaded members with constraints whereby one of said pair is torsionally constrained by said actuable reaction element and one of said pair is axially constrained.

8. Mechanism as in claim 1, wherein a non-irreversible mechanism connects said directing member with said kinematic machine.

9. Mechanism as in claim 1, wherein said dirigible member is operable by an at least partial gear operable by a rack operable by said kinematic machine.

10. Mechanism as in claim 1, and a terrestrial vehicle including elements for changing the direction of motion of the vehicle in response to said motion of said dirigible member, wherein said directing member is a manually operable steering member.

11. Mechanism as in claim 10, wherein said elements for changing the direction of motion of the vehicle are the steerable front wheels of the vehicle and said steering member is a hand steering wheel.

12. Mechanism as in claim 10, wherein said power modulating means includes at least one element responsive to an effect of changing the direction of motion of the vehicle, for actuation of said power drive means to effect steering of said vehicle in opposition to said changes.

13. Mechanism as in claim 1, including means whereby one of said responsive elements of said power modulating means is responsive to the departure from a selected initial position of said directing member in said mode, for actuation of said power drive means to effect supplemental motion of said dirigible member from its corresponding initial position.

14. Mechanism as in claim 13, including means to effect greater supplemental motion per unit of said departure as said departure increases, through at least part of the range of motion of said directing member.

15. Mechanism as in claim 1, including means whereby one of said responsive elements is responsive to said movement of either of said members with respect to the other, for inducing counter-actuation of said power drive means, and means whereby said power drive means is highly responsive to the resulting sum of the selected effects.

16. Mechanism as in claim 1, including a second kinematic machine interposed to operably connect said members in said modes, wherein at least one of said responsive elements is interposed in and operable by said second kinematic machine.

17. Mechanism as in claim 16, wherein said second kinematic machine tends to effect motion of said dirigible member, per unit of motion of said directing member, in excess of that tending to be effected by the first said kinematic machine in the absence of motion of said reaction element.

18. Mechanism as in claim 16, wherein said second kinematic machine tends to effect motion of said dirigible member, per unit of motion of said directing member, increasing with departure of selected elements of said second kinematic machine from a selected initial relative position, through at least part of the range of said departure.

19. Mechanism as in claim 16, wherein said second kinematic machine tends to effect motion of said dirigible member, per unit of motion of said directing member, increasing with departure of selected elements of said kinematic machine from a selected initial relative position, through at least part of the range of said departure.

20. Mechanism as in claim 16, wherein the first said kinematic machine includes a manually rotatable first screw with first nut thereon engaged axially with a rack engaged with a pinion whereby said dirigible member is operable, said nut is torsionally operable by said actuating means, and wherein said second kinematic machine includes a first gear on the shaft of said screw, meshed with a second gear on the shaft of a second screw with a second nut thereon engaged axially with said rack, said responsive element is interposed between the shaft of said first screw and said first gear and is increasingly resistant to motion therebetween, and a slippage device is interposed in said second kinematic machine.

21. Mechanism as in claim 1, with means for the operation of at least one of said responsive elements through an interposed mechanical releif device.

22. Mechanism as in claim 21, wherein frictional slippage provides said releif.

23. Mechanism as in claim 21, and means whereby said responsive element becomes unresponsive when relief is provided by said relief device.

24. Mechanism as in claim 1, wherein said actuating means is irreversible.

25. Mechanism as in claim 1, wherein said actuating means provides effort at least in part decreasingly diminishing with increase of actuation velocity.

26. Mechanism as in claim 1, wherein said actuating means is fluid powered.

27. Mechanism as in claim 1, wherein said actuating means is electrically powered.

28. Mechanism as in claim 27, using a motor at least in part series wound.

29. Mechanism as in claim 1, wherein said actuating means is mechanically powered from a steadily rotating shaft.

30. Mechanism as in claim 1, wherein a responsive element of said power modulating means includes pressure-sensitive resistive elements connected in a bridge circuit whereof at least one of two opposite resistive elements is compressed while an equal number of the remaining elements are decompressed.

* * * * *